United States Patent

Chesley

[11] Patent Number: 5,081,691
[45] Date of Patent: Jan. 14, 1992

[54] FILTERING TECHNIQUES

[76] Inventor: Duncan M. Chesley, 36 Long Plain Rd. R.F.D., So. Deerfield, Mass. 01373

[21] Appl. No.: 478,012

[22] Filed: Feb. 7, 1990

Related U.S. Application Data

[63] Continuation of Ser. No. 7,321, Jan. 27, 1987, abandoned.

[51] Int. Cl.$^5$ .................................................. G06K 9/40
[52] U.S. Cl. ........................................ 382/54; 382/51; 388/455; 388/456; 388/80
[58] Field of Search ............... 364/513, 514, 518, 522, 364/572, 724, 825; 358/22, 80, 166, 167, 280, 282, 283, 284; 382/18, 41, 48–84, 56

[56] References Cited

U.S. PATENT DOCUMENTS

| | | | |
|---|---|---|---|
| 3,805,239 | 4/1974 | Watanabe | 382/51 |
| 3,885,866 | 5/1975 | Stearns | 358/26 |
| 3,901,595 | 8/1975 | Helaua et al. | |
| 3,987,244 | 10/1976 | Messman | 178/7.2 |
| 3,999,047 | 12/1976 | Green | 382/51 |
| 4,216,528 | 8/1980 | Robertson | 364/468 |
| 4,281,312 | 7/1981 | Knudson | 340/146.3 |
| 4,285,004 | 8/1981 | Morrison et al. | 358/10 |
| 4,345,276 | 8/1982 | Colomb | 358/258 |
| 4,358,789 | 11/1982 | Confer | 358/140 |
| 4,442,545 | 4/1984 | Reitmeier et al. | 382/56 |
| 4,463,372 | 7/1984 | Bennett et al. | 358/22 |
| 4,467,354 | 8/1984 | Eby, Jr. et al. | 358/133 |
| 4,472,732 | 9/1984 | Bennett et al. | 358/22 |
| 4,504,864 | 3/1985 | Anastassiou et al. | 358/167 |
| 4,511,928 | 4/1985 | Colomb | 358/280 |
| 4,539,596 | 9/1985 | Elabd | 358/213 |
| 4,543,826 | 10/1985 | Ferrari | 73/602 |
| 4,545,070 | 10/1985 | Miyagawa et al. | 382/48 |
| 4,554,593 | 11/1985 | Fox et al. | 358/455 |
| 4,566,125 | 1/1986 | Clunn | 382/48 |
| 4,571,619 | 2/1986 | Mewitz | 358/160 |
| 4,628,366 | 12/1986 | Yamada | 358/282 |
| 4,646,355 | 2/1987 | Petrick et al. | 358/456 |
| 4,654,720 | 3/1987 | Tozawa | 358/283 |
| 4,663,663 | 5/1987 | Lee | 358/80 |
| 4,672,463 | 6/1987 | Tomohisa et al. | 358/284 |
| 4,745,466 | 5/1988 | Yoshida et al. | 358/80 |
| 4,752,822 | 6/1988 | Kawamura | 358/80 |

Primary Examiner—Michael Razavi
Assistant Examiner—Jose L. Couso
Attorney, Agent, or Firm—Weingarten, Schurgin, Gagnebin & Hayes

[57] ABSTRACT

A digital filter for a digitized graphic image which eliminates border aberrations in the transition from one color to another in the image, which eliminates isolated dots while retaining isolated background in the center of alphanumeric characters, provides uniform coloration of half tone areas, corrects error colors to a predetermined color and selectively provides mode filtering on the digitized signal. Prior to any filtering of digitized signals, sets of predetermined colors for half tone, solids, errors and thresholds for various logic functions of the filter are established. The filter then converts each pixel in an array to a different color or maintains its color dependent on logical processing in several levels of selectively branching logic.

1 Claim, 3 Drawing Sheets

FILTERING TECHNIQUES

This application is a continuation of application Ser. No. 07/007,321, filed Jan. 27, 1987 now abandoned.

FIELD AND BACKGROUND OF THE INVENTION

There is an increasing desire and necessity to convert maps and charts, such as are used in air and sea navigation, to digital signals. The motivation for digitizing the cartographic images is seen in the advantage in space in being able to store great numbers of charts electronically, in being able to electronically overlay radar or other indicia, and in being able to display portions or combinations of charts in decision making situations needing a great number of cartographic images available at once. Finally the updating of the many charts of the earth is more rapidly and economically done if in digital form.

The present craft of the cartographer has produced charts of great precision and clarity which, in combination with multicolor presentations in a two dimensional image, allows the viewer to rapidly process navigation or other graphic information from them. In the process of digitizing these images, with or without the use of mode filtering, many errors are encountered which greatly impair the usefullness of the image or destroy it completely. Among these are the loss of smoothness to borders between areas of different colors, such as lines. The border often is blurred by an off-color edge produced by digitizing errors. Half tone regions common on charts are often treated erratically due to the random phasing between half tone dots and scan pixels in the digitizing process. The definition of alphanumeric characters is often impaired in the scanning and digitizing process. Error colors also tend to creep into the digitized signal.

Some of these errors are apparent to the viewer when seeing the electronic display or printout of the digitized signals. They can be then manually corrected, but the effort is so time consuming as to make the use of digitized images very costly.

BRIEF SUMMARY OF THE INVENTION

In accord with the teaching of the present invention there is shown an electronic filter for the digitized output of a graphic scanning system. The filter corrects the majority of the errors encountered in the digitizing of multicolor charts and maps. Filtering is provided to remove the aberrations often encountered at the borders of lines and elongated or linear elements on a chart and is selectively utilized by filter decisional logic to prevent it from acting on one as when it is likely to have an adverse impact, this filtering also homogenizes the areas of half tone coloration common in charts. Alphanumeric characters retain their normal appearance without filled-in holes and indentations. Random dots in the half tone areas are eliminated and residual visual errors are removed in a machine assisted semi-automatic mode.

In advance of the digital signal filtering there is an electronic scan of the chart or map, preferably with a resolution of between four and nine pixels of digitized information covering the smallest element of interest on the chart or map.

DESCRIPTION OF THE DRAWING

These and other features of the present invention are more fully described in the following solely exemplary description and accompanying drawing of which.

DETAILED DESCRIPTION

Figure 1:
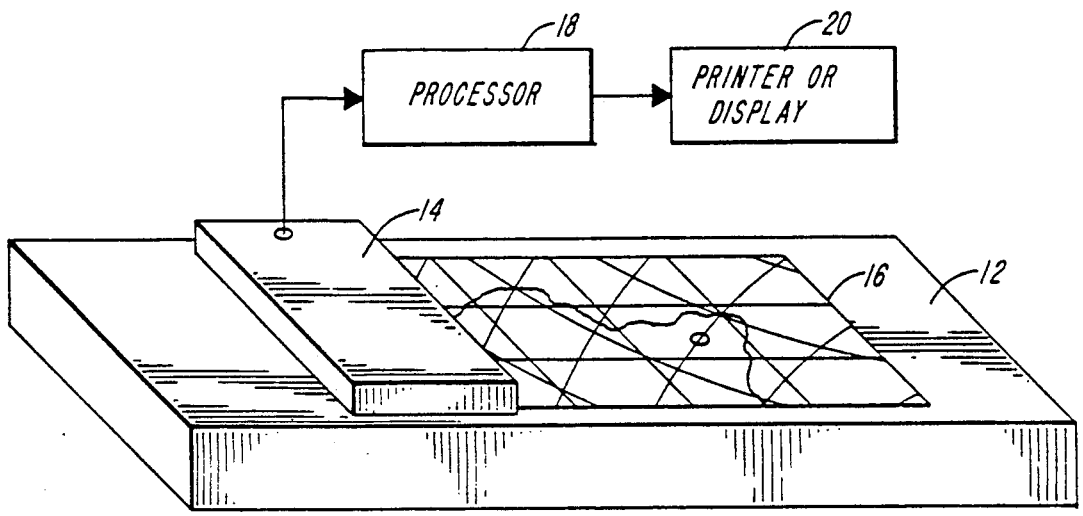
FIG. 1 is a diagram of scanning and digitizing apparatus according to the present invention.

According to the teaching of the present invention there is shown a system for digital filtering including decisional logic for selectively applying mode filtering, of digitized signals produced in the scan of a graphic multidimensional image, including the graphic lines of alphanumerics. FIG. 1 shows apparatus for accomplishing the scanning and digitizing as well as the filtering of the digitized signal that results from scanning. The apparatus is shown to include a scanning unit 12 having a scanning head 14 in the process of scanning a chart 16. The video signals from the scanning of the chart 16 are applied from the head 14 to a processor 18 for digitizing and optionally for intermediate storage in magnetic media. The processor 18 additionally operates to provide the digital filtering of the digitized video signals according to the flow charts below. The digitized and filtered data may be displayed or printed by an output device 20.

Figure 2:
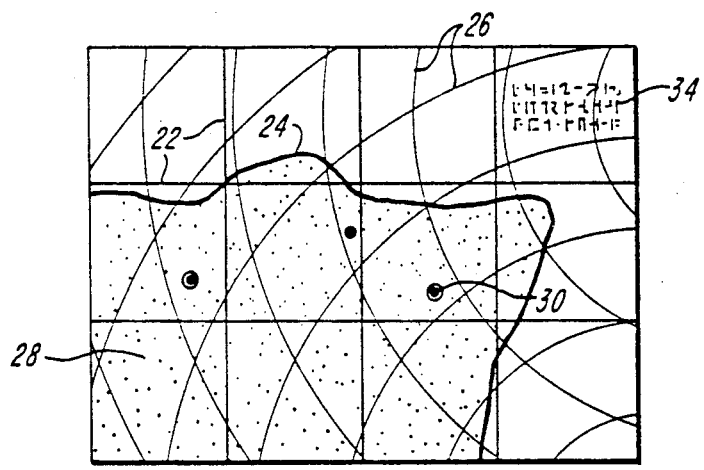
FIG. 2 is a representation of an exemplary chart or map being digitized.

FIG. 2 is a representation of a chart having various features which it is essential to digitize. These features include latitude and longitude lines 22, shoreline 24, loran or omega lines 26, regions 28 of pastel coloration in half tone such as the shallow sea, various bouys or other marks 30 and alphanumerics 34. All of these are to be digitized and made available for display or printout on the output device 20.

Figure 3:
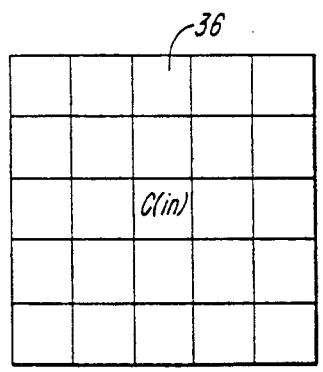
FIG. 3 is a representation of a pixel format for the operation of the present invention.

In digitizing the chart information, the scanning mechanism will generate video data pixels at a predetermined rate of pixels per inch. Preferably the scanning system provides four to nine pixels for the least size element on the chart that it is desired to digitize. The output of the scanner 12 is a digital representation of the ink color C. FIG. 3 shows an array of pixels 36 which is dimensioned five by five and has a center pixel identified as C(in). This array is the size of data that is typically processed in the filter for each C(in). Other array sizes may be used as desired or effective in individual applications.

Figure 4:
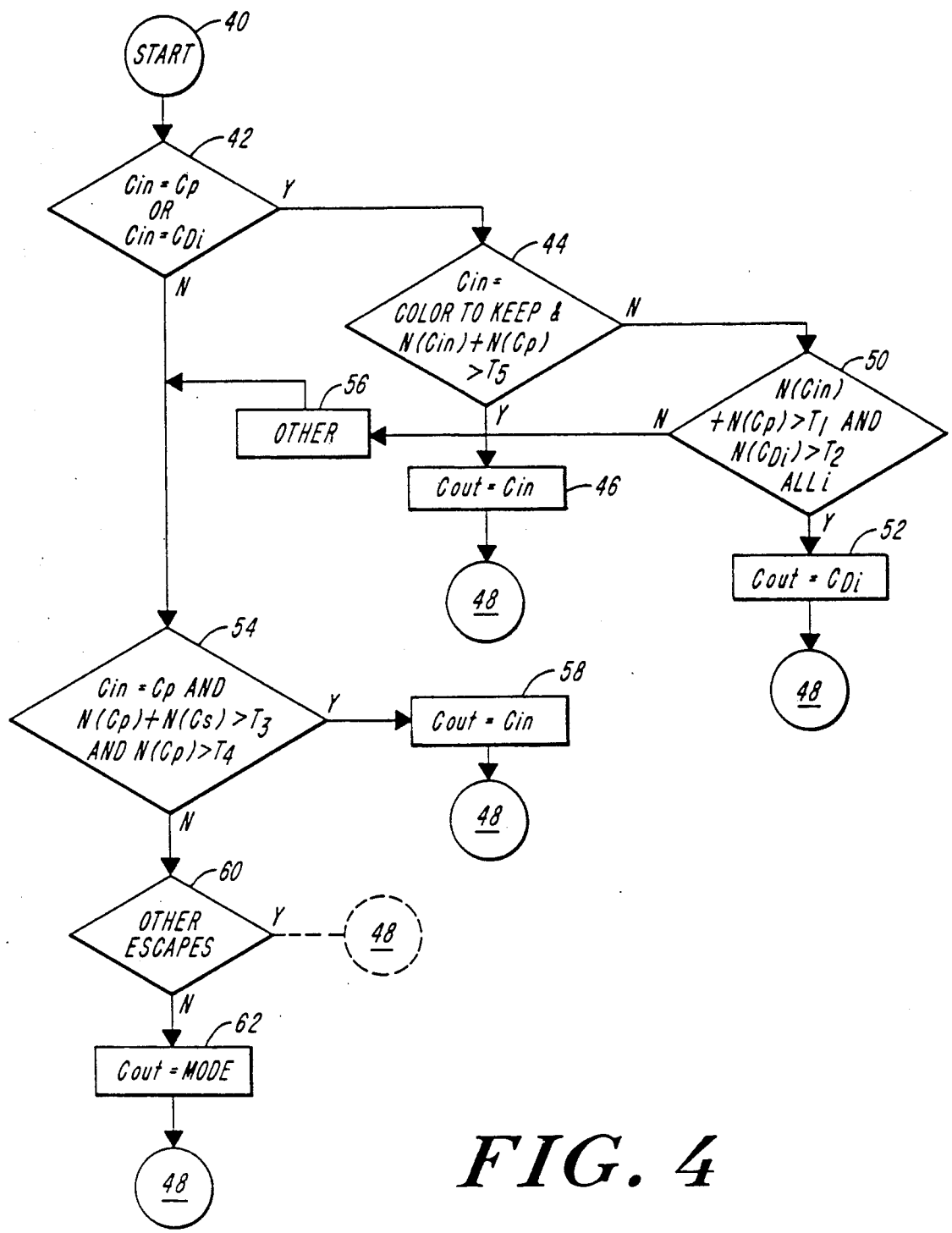
FIG. 4 is a flow chart of digital filtering according to one aspect of the invention.
Figure 5:
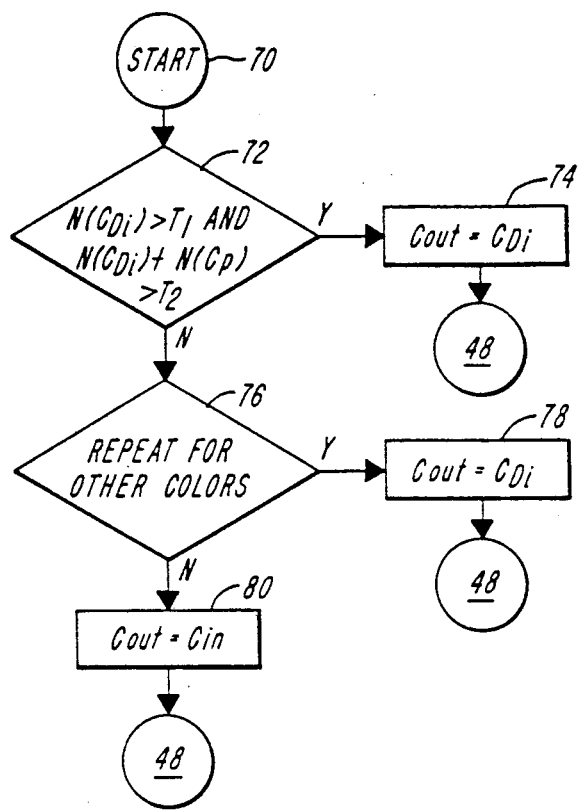
FIG. 5 is a flow chart of digital filtering according to a further aspect of the invention.
Figure 6:
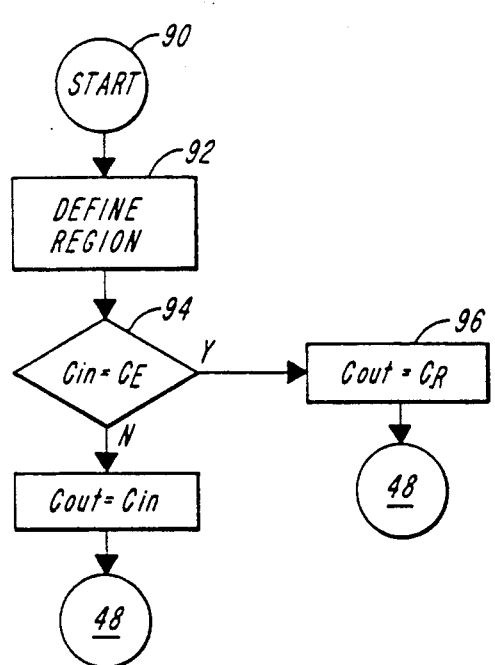
FIG. 6 is a flow chart of digital filtering according to a yet further aspect of the invention.

The filter processing is illustrated in the flow charts of FIGS. 4, 5, and 6. Before proceeding to that processing, the conventions of the processing of the digital filtering must be described. C(in) represents the pixel that is being processed at any given instant. The output of the filter is designated C(out). The other variables or thresholds are set in advance for each chart as follows:

C(p) represents the background color of the chart;

C(Di) are the colors of the half tone dots, usually pastels;

C(Si) are the solid colors on the chart;

Colors-to-keep are a subset of the C(Si) and/or C(Di) colors that are to be retained in the output; and not subjected to mode filtering N(c) is the histogram of the five by five pixel of FIG. 3. As such it identifies the number of pixels in that array that are of each color. Arrays of a size other than five by five may be used and histograms for such arrays would cover the entire array. The center pixel value for the histogram for that pixel may be omitted from the associated histogram.

T1, T2, T3, and T4 are thresholds set at the outset of chart processing. The filtered image may be displayed to the user and the threshold and/or designations of colors changed for a further or alternative filtering with different results.

Turning to the flow charts, in FIG. 4 presents processing that preceeds a mode filter to select pixels that should not be processed by the mode filter. The illustrated processing is operative for the cartographic features of NOAA Nautical Charts. From a start state 40 processing first proceeds to a decision state 42 in which the input pixel is tested for whether it is of the background color or one of the half tone colors. If it is either, processing proceeds to a state 44 which tests for whether the input pixel is both a color-to-keep and satisfies the histogram relationship. This step determines whether the color is a to keep color and it or the background color are sufficiently common in the array to indicate a real feature which must not be processed and thus destroyed in the mode filter. If this condition is met then the processing continues to a step 46 which provides the input as the output. Thereafter processing returns to process the next pixel in step 48. If the test of step 44 was not met, processing continues to a state 50 which has two histogram conditions to satisfy, taken over all the C(Di) colors, one at a time. The purpose of this state is to determine if the input pixel is in the half tone area and to convert it to that color if that condition is found to exist. Thus if the test of state 50 is met, processing continues through to a state 52 which provides as the output color the half tone color of the region.

Assuming that in state 42 neither test was satisfied, processing proceeds to a state 54. This state is also entered from a failure to satisfy the test of state 50 with or without intermediate steps 56. In state 54 processing tests to determine if there is a white or background region in the center of a character and acts to retain that color in a further step 58. If that condition is not satisfied in state 54, processing continues to optional other states 60, if any, and on to a state 62 if their determination is not positive. State 62 is a mode filter as that term is known in the art. It operates to assign to the output the value of the plurality color in the array based on the histogram of that or other arrays.

After exiting the processing of FIG. 4, the processing of FIG. 5 is typically entered. This set of steps is targeted at removing isolated dots. From a start state 70 a decision state 72 tests whether a set of histogram conditions are met. The purpose of this decision is to determine if the input pixel is a dot in a half tone region. If that condition is met, the decision sets the output pixel to the dominant color of the half tone region in a step 74. If the test of step 72 is not satisfied, processing repeats the same test in decision 76 until all the C(Di) colors are checked, converting the output pixel to the dominant histogram color found in the test in a step 78. If none of those tests are satisfied, step 80 provides the input pixel as the output pixel.

The processing of FIG. 5 for dot elimination may be repeated one or more times, depending on whether it found any dots to correct in the prior pass, until all are eliminated.

The final filtering process is shown in FIG. 6 which is aimed at providing a semi-automatic, or machine enhanced, elimination of random error colors in the digitized chart. From a start state the processing proceeds to a step 92 in which the system operator identifies the boundaries of a region in which the filter is to operate. The region is visually determined from inspection of where error colors of a predetermined one or more colors are found. The colors, C(E), that are to be considered as error colors may also be specified in this step. A subsequent processing step 94 tests each pixel for whether it is of that one or more error colors. If it is found to be such an error color, then processing branches to a step 96 in which the output pixel is specified as a special replacement color, C(R). The replacement color may be specified in the step 92 and may be a single color for all error colors or may be dependent on the error color. If no error color is detected in the test step 94, processing branches to a step 98 where the output pixel is defined to be the same as the input pixel.

The above detailed description exemplifies a filtering system for rapid and efficient removal of noise, clutter, and other aberrations from the digitized representation of a chart, typically a NOAA Chart. Other charts may be best filtered by a different set of escapes from a mode filter. The processing may be done over all colors at a single time, or a complete pass may be made for each of several colors such as red, green and blue and the filtered data for each color separately stored. For these and other reasons, the specific description above is only exemplary. The scope of the invention is thus to be determined only from the following claims.

I claim:

1. A system for filtering digital signals representative of color in pixels of multidimensional graphic information comprising:

means for receiving a digital signal representation of color in pixels, said received digital signal comprising chromatically multicolor, multifeature graphic information;

means for recognizing an array of pixels circumjacent to each pixel;

treating means, responsive to the digital graphic information in the array of pixels circumjacent to each pixel, for treating that pixel according to a methodology which selectively filters the digital signal representation of the pixel to produce selectively filtered digital signals by a first digital filtering process which includes a chromatic color dependent filtering process selectively causing the digital signal representation to be filtered by a second digital filtering process and for removing random dots;

means responsive to the filtered digital signals for creating a representation of said multifeature graphic information as filtered more accurately representative of said multifeature graphic information than the received digital signal;

said treating means chromatic color dependent filtering process including means for processing colors (cin) in each pixel of said digital graphic information by:

determining in a first step (42) if a pixel color (Cin) is a background color of a halftone dot color;

determining in a second step (44), in response to a positive determination in said first step (42) if a pixel color is a predetermined "color to keep" and a sum of a histogram of pixels with a histogram of pixels of background colors exceeds a first threshold (T5);

determining in a third step (50) reached by a negative determination in said second step (44) if a sum of a histogram of pixels with a histogram of pixels of background colors exceeds a second threshold (T1) and a histogram of pixels of halftone dots, exceeds a third threshold (T2);

determining in a fourth step (54) in response to a negative determination in said first step or said third step if a pixel is a background color and a sum of a histogram of pixels of background color and a histogram of pixels of a solid color exceeds a fourth threshold (T3) and a histogram of pixels of a background color exceed a fifth threshold (T4);

generating (46, 58) an unchanged output pixel in response to a positive determination in said second and fourth determining steps;

generating (52) an output pixel of a background color corresponding to a background color causing a positive determination in said third step; and generating (62) an output pixel corresponding to a plurality color in said array in response to a negative determination in said fourth step;

said treating means second digit of filtering process including means for processing each pixel of said digital graphing information by:

determining in a second first step (72) if a histogram of pixels of a color of halftone dots exceeds a second first threshold (T1) and a sum of a histogram of pixels of a color of halftone dots and a histogram of background colors exceeds a second threshold (T2);

repeating (76) said first step for all halftone dot colors;

generating (74, 78) an output pixel of a color corresponding to a halftone dot color in response to a positive determination in said second first step; and generating (80) an unchanged output pixel in response to a negative determination in said second first step;

said treating step further including the steps of:

defining (92) an error color for pixels within an area;

converting (96) each pixel of error color in said area to a replacement color.

* * * * *

UNITED STATES PATENT AND TRADEMARK OFFICE
CERTIFICATE OF CORRECTION

PATENT NO. : 5,081,691

DATED : January 14, 1992

INVENTOR(S) : Duncan M. Chesley

It is certified that error appears in the above-identified patent and that said Letters Patent is hereby corrected as shown below:

Column 4, line 68, "a background color of a halftone" should read --a background color or a halftone--.

Signed and Sealed this

Sixth Day of July, 1993

Attest:

MICHAEL K. KIRK

Attesting Officer

Acting Commissioner of Patents and Trademarks